Jan. 5, 1937.  A. E. RUTTER  2,067,130
SIDE DELIVERY RAKE
Filed Sept. 14, 1935  2 Sheets-Sheet 1
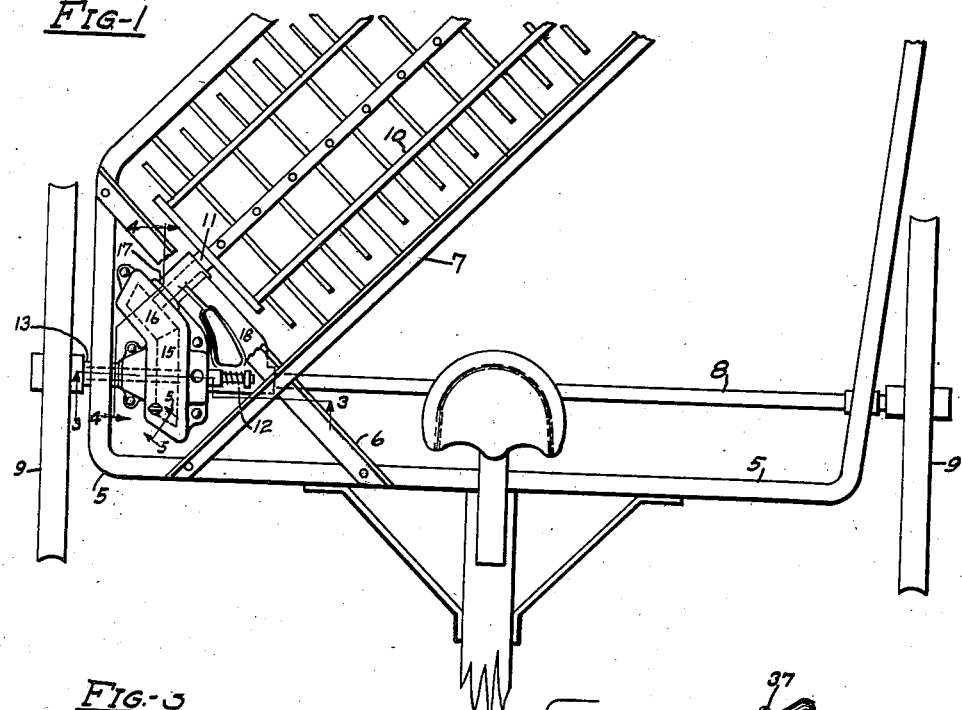
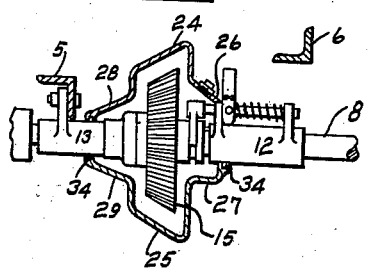
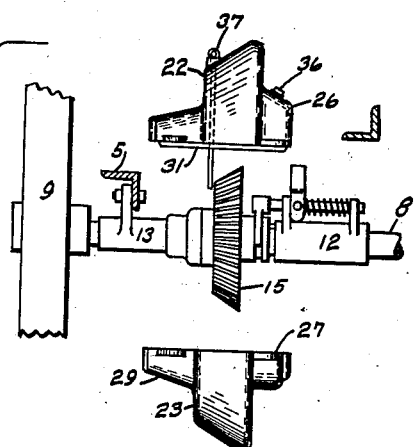
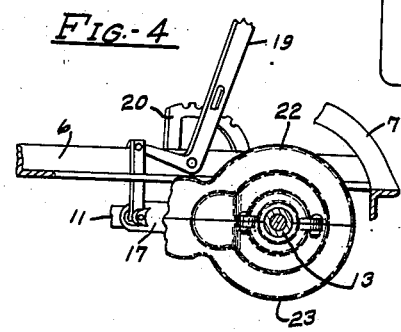
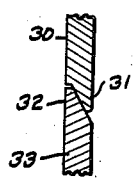
INVENTOR.
ALVAH E. RUTTER
BY James A. Walsh
ATTORNEY Jan. 5, 1937.  A. E. RUTTER  2,067,130
SIDE DELIVERY RAKE
Filed Sept. 14, 1935  2 Sheets-Sheet 2

INVENTOR.
ALVAH E. RUTTER
BY James A. Walsh,
ATTORNEY

Patented Jan. 5, 1937

2,067,130

UNITED STATES PATENT OFFICE 2,067,130

SIDE DELIVERY RAKE

Alvah E. Rutter, Rockford, Ill., assignor to J. I. Case Company, Racine, Wis., a corporation Application September 14, 1935, Serial No. 40,585

12 Claims. (Cl. 56—376)

My invention relates to improvements in side delivery rakes of the type employing gears for actuating the reel shaft, many of which implements are supplied with such gears exposed, but which for safety and protection against wear it is desirable to enclose. It is therefore my object to provide a gear housing which may be readily attached to present rakes in the field without the necessity of altering the construction thereof, and of such character that it may be installed initially in the course of manufacture, or the user of a rake with exposed gears may obtain and readily apply such housing.

Figure 6:
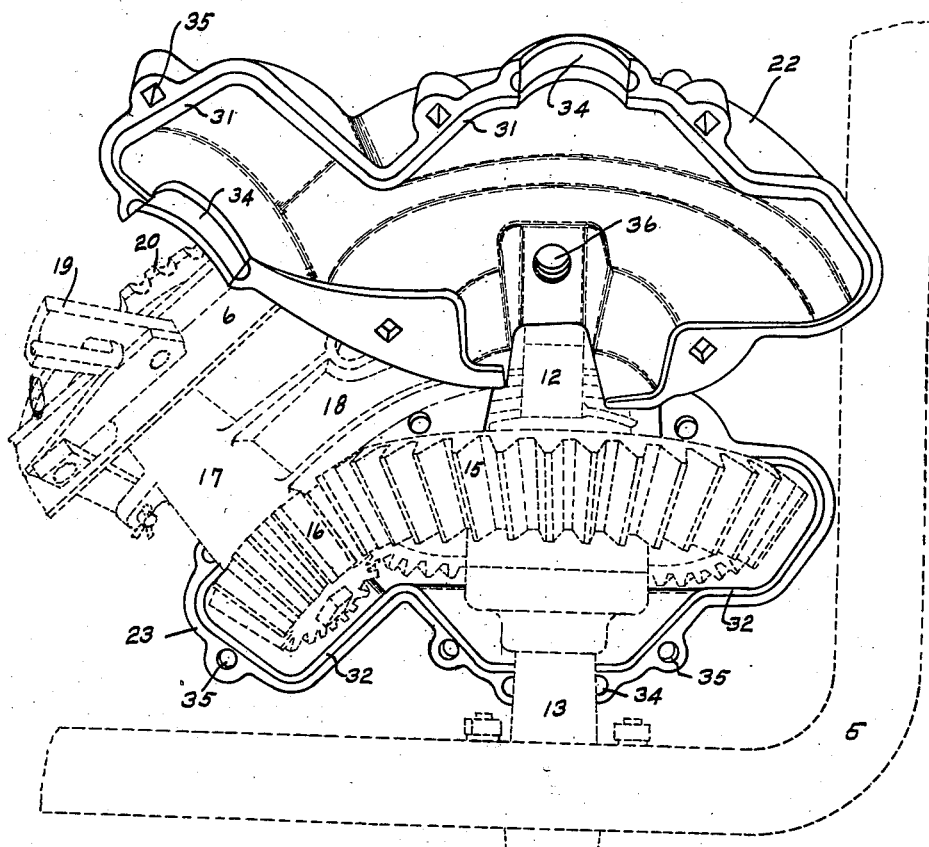
Figure 7:
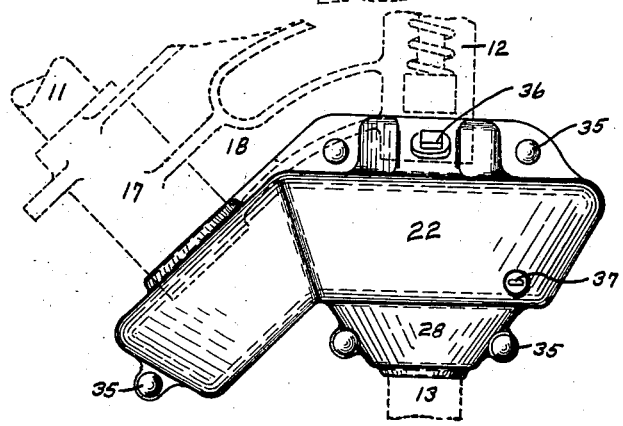

In the accompanying drawings, forming part hereof, Figure 1 is a fragmentary plan of a rake embodying my improvement; the adjusting lever being omitted for the purpose of clearness; Fig. 2, a disassembled elevation in detail showing the relation of the housing to associated parts; Figs. 3, 4 and 5, detail sections taken on the dotted lines 3—3, 4—4 and 5—5, respectively, in Fig. 1; Fig. 6, a plan view of the gears and lower member of the housing, the upper member being tipped back from the lower member, and Fig. 7 is a plan view of the assembled housing.

In the drawings the numerals 5, 6, 7, indicate the frame of the implement, 8 the axle, 9 the supporting and driving wheels, 10 the toothed reel, and 11 the driving shaft for the reel.

The axle 8 extends through an inner or clutch bearing 12 of well known construction and an outer bearing 13 suspended from frame 5, a bevel gear 15 being mounted upon the axle between said bearings, and which gear engages a gear 16 on the shaft 11 for operating the reel 10, said shaft being supported in a bearing 17 connected to the bearing 12 by a keeper 18, and which shaft is adjusted vertically by a lever 19 on the frame which engages a quadrant 20 in a well known manner. As the parts referred to may be of any desired construction and arrangement it is deemed unnecessary to specifically describe the same.

In field operations, when the reel 10 is being adjusted by the lever 19 a rocking motion is imparted to the reel, which causes gear 16 to climb back and forth on gear 15, and it is my object, as hereinbefore indicated, to provide a simple housing for such two-gear drive for rakes which may be readily installed in such manner as to follow the rocking motions referred to without strain or distortion of the assembled parts. In carrying out my invention I employ a housing comprising upper and lower members 22, 23, respectively, angulated in form, as indicated in Fig. 7, the chamber produced by these members when assembled having an enlarged portion for accommodating gear 15, and a smaller chamber for enclosing gear 16 in mesh with said gear 15. Each of the housing members is a one-piece structure, one member being substantially the counterpart of the other and each embodying an enlargement 24, 25, from the ends of which extend clamping members 26, 27, adapted to be fixedly secured to bearing 12, Fig. 3, while the opposite ends 28, 29, terminate in tapered formation and are rotatably mounted on bearing 13.

The upper and lower housing members at their meeting edges are formed to provide an oil-tight joint, without gaskets, that is, the walls 30 of the upper member terminate in an inwardly and downwardly inclined lip 31 mating with an upwardly and outwardly inclined seat 32 on the upper edge of the walls 33 of the lower member, as indicated in Fig. 5, while other portions of the edges of the housing members which contact the bearings 12, 13, include fillers 34 for preventing oil leakage. When said members have been assembled and clamped together about bearing 12 by bolts inserted through the registering holes 35 the gears therein may be supplied with oil through an inlet 36 in the upper housing member, and the quantity in the housing may be determined when desired by a removable or other indicator, as 37, in a well known manner, and it will be understood that the axle 8 and rake shaft 11 are lubricated by seepage of oil from the gear housing.

In operation, when lever 19 is adjusted in opposite directions the reel 10 with its shaft will be slightly raised or lowered accordingly, and at the same time the bearings 12, 17, keeper 18, and the housing with the gears therein, will rock about bearing 13, which rocking motions will be free and unimpeded as there will be no twisting or straining of any of the parts, and by providing the housings in the sections and of the formations illustrated means are afforded for installing the same at will in connection with rakes already in use or during the manufacture thereof, so that I am enabled to supply such implements with either exposed or enclosed gears as desired by the user, and which if initially exposed may be subsequently readily equipped with my improved housing in the simple manner disclosed.

I claim as my invention:

1. The combination, in a rake, of a frame, a driving axle on the frame having a gear thereon, a reel mounted on the frame, a drive shaft mounted on the reel and having a gear thereon meshing with the first mentioned gear and actuated thereby, an inner bearing on the axle, an outer bearing on the axle, a housing enclosing said gears fixedly secured to the inner bearing and rotatably mounted on the outer bearing, and means for raising and lowering the reel to rock the drive shaft and gear thereon simultaneously with said housing.

2. The combination, in a rake, of a frame, a driving axle on the frame having a gear thereon, a reel mounted on the frame, a drive shaft on the reel having a gear thereon meshing with and actuated by the first mentioned gear, an inner bearing on the axle at one side of the gear thereon, an outer bearing on the axle on the opposite side of said gear, a housing comprising upper and lower members enclosing said gears and fixedly secured to the inner bearing and rotatably mounted on the outer bearing, means for securing the housing members together about said gears, and means for rocking the drive shaft and gear thereon simultaneously with said housing.

3. The combination, in a rake, of a frame, a driving axle on the frame having a gear thereon, a reel mounted on the frame, a drive shaft on the reel having a gear thereon meshing with and actuated by the first mentioned gear, a bearing on the drive shaft, a bearing on the axle rigidly connected to the first mentioned bearing, a bearing on the outer end of the axle, a housing comprising upper and lower members enclosing said gears and fixedly secured to the first mentioned bearing on the axle and rotatably mounted on the bearing at the outer end thereof, and means for securing the housing members together about said gears.

4. The combination, in a rake, of a frame, a driving axle on the frame having a gear thereon, a reel mounted on the frame, a drive shaft on the reel having a gear thereon meshing with and actuated by the first mentioned gear, a bearing on the axle adjacent the gear thereon, a housing enclosing the gears and fixedly secured at one end to the bearing and its opposite end concentrically mounted in relation to the axle, and means for raising and lowering the reel to rock the drive shaft and gear thereon simultaneously with said housing.

5. The combination, in a rake, of a frame, a driving axle on the frame having a bearing thereon, a reel mounted on the frame, a drive shaft on the reel having a bearing thereon fixedly connected to the bearing on the axle, a gear on the axle, a gear on the drive shaft engaging and actuated by the gear on the axle, a housing comprising a plurality of members enclosing said gears and fixedly secured to the bearing on the axle and at its opposite end concentrically mounted in relation to the axle, and means on the frame for simultaneously rocking the drive shaft and the housing.

6. The combination, in a rake, of a frame, a driving axle on the frame having a bearing thereon, a reel mounted on the frame, a drive shaft on the reel, a gear on the axle, a gear on the drive shaft engaging and actuated by the gear on the axle, an angulated housing enclosing the gears and fixedly secured at one end to the bearing and at its opposite end concentrically mounted in relation to the axle, and means on the frame for simultaneously rocking the drive shaft and the housing.

7. The combination, in a rake, of a frame, a driving axle on the frame having a bearing thereon, a reel mounted on the frame, a drive shaft on the reel, a gear on the axle, a gear on the drive shaft engaging and actuated by the gear on the axle, a housing embodying an enlarged gear-receiving portion and tapered ends projecting in opposite directions from said enlarged portion, means for fixedly securing one of the housing ends to the bearing and concentrically mounting the opposite end in relation to the axle, and means on the frame for simultaneously rocking the drive shaft and housing.

8. The combination, in a rake, of a frame, a driving axle on the frame having a gear thereon, a reel mounted on the frame, a drive shaft on the frame having a gear thereon meshing with and actuated by the first mentioned gear, a bearing on the axle adjacent the gear thereon, a housing comprising upper and lower members enclosing said gears and fixedly secured at one end to the bearing, said housing members having inclined meeting edges, and means for raising and lowering the reel to rock the drive shaft and gear thereon simultaneously with said housing.

9. The combination, in a rake, of a driving axle, a reel shaft, intermeshing gears on said axle and reel shaft, and a housing for said gears comprising upper and lower members enclosing said gears, said housing members having downwardly and inwardly inclined meeting edges for preventing escape of lubricant between said members, said upper member providing an opening therein, and a lubricant measuring element removably inserted in said opening, and extending into said lower member.

10. The combination, in a rake, of a frame, a driving axle on the frame having a gear thereon, a reel mounted on the frame, a drive shaft on the reel having a gear thereon meshing with and actuated by the first mentioned gear, a bearing on the drive shaft, a bearing on the axle, a second frame rigidly connecting the bearings for maintaining correct spacing of said axle and shaft for proper meshing of said gears, a bearing on the outer end of the axle and fixed with the first mentioned frame, a housing comprising upper and lower members enclosing said gears and fixedly secured to the first mentioned bearing on the axle and rotatably mounted on the bearing at the outer end thereof, and a manually operable member arranged to raise and lower said drive shaft, said movement being permitted by swinging of said second frame and said housing about said axle with the first mentioned bearing on the axle, said housing swinging about the bearing on the outer end of said axle.

11. The combination, in a rake, of a driving axle, a reel shaft, intermeshing gears on said axle and reel shaft, and a housing for said gears comprising upper and lower members enclosing said gears, the upper member being formed with a downwardly extending lip and the lower member being formed with a seat arranged to enclose said downwardly extending lip of the upper member when said members are placed together for preventing the escape of lubricant between said members, one of said members having an opening for replenishment of lubricant in said housing.

12. The combination, in a rake, of a driving axle, a reel shaft, intermeshing gears on said axle and reel shaft, and a housing for said gears comprising upper and lower members enclosing said gears, said upper member providing an opening therein, and a lubricant measuring element removably inserted in the opening and extending into the lower member between the inner surface thereof and one of said gears.

ALVAH E. RUTTER.